US 8,771,859 B2

(12) United States Patent
Matsumoto et al.

(10) Patent No.: US 8,771,859 B2
(45) Date of Patent: Jul. 8, 2014

(54) SEPARATOR FOR BATTERY AND NONAQUEOUS ELECTROLYTE BATTERY USING SAME

(75) Inventors: Nobuaki Matsumoto, Osaka (JP); Hideaki Katayama, Osaka (JP); Yoshinori Sato, Osaka (JP)

(73) Assignee: Hitachi Maxell, Ltd., Ibaraki-Shi (IL)

( * ) Notice: Subject to any disclaimer, the term of this patent is extended or adjusted under 35 U.S.C. 154(b) by 663 days.

(21) Appl. No.: 13/059,095

(22) PCT Filed: Mar. 10, 2010

(86) PCT No.: PCT/JP2010/054040
§ 371 (c)(1),
(2), (4) Date: Feb. 15, 2011

(87) PCT Pub. No.: WO2010/104127
PCT Pub. Date: Sep. 16, 2010

(65) Prior Publication Data
US 2011/0143183 A1    Jun. 16, 2011

(30) Foreign Application Priority Data

Mar. 13, 2009   (JP) .................... 2009-060409

(51) Int. Cl.
*H01M 2/16* (2006.01)

(52) U.S. Cl.
USPC ........... 429/144; 429/249; 429/251; 429/252; 429/254

(58) Field of Classification Search
USPC .................... 429/144, 249, 251, 252, 254
See application file for complete search history.

(56) References Cited

U.S. PATENT DOCUMENTS

| 2007/0264577 A1 | 11/2007 | Katayama et al. |
| 2009/0067119 A1 | 3/2009 | Katayama et al. |
| 2009/0111025 A1 | 4/2009 | Lee et al. |
| 2011/0052987 A1 | 3/2011 | Katayama et al. |

FOREIGN PATENT DOCUMENTS

| CN | 1539550 A | 10/2004 |
| EP | 1 965 454 A1 | 9/2008 |
| JP | 10-249974 A | 9/1998 |
| JP | 2008-123996 A | 5/2008 |
| JP | 2008-524824 A | 7/2008 |
| JP | 2008-210791 A | 9/2008 |
| JP | 2009-114434 A | 5/2009 |
| WO | WO 2009/044741 A | 4/2009 |

OTHER PUBLICATIONS

Chinese Office Action, dated Feb. 27, 2013, issued in corresponding Chinese Patent Application No. 201080002320.0.
International Search Report dated Jun. 1, 2010 in International Application No. PCT/JP2010/054040.
Japanese Office Action, dated Aug. 21, 2012, for Japanese Application No. 2010-526875, along with an English translation.

*Primary Examiner* — Laura Weiner
(74) *Attorney, Agent, or Firm* — Birch, Stewart, Kolasch & Birch, LLP

(57) ABSTRACT

A separator for batteries according to the present invention includes a multilayer porous film having a resin porous film containing a thermoplastic resin as a main component and a heat resistant porous layer containing heat resistant particles as a main component, and the heat resistant porous layer has a thickness of 1 to 15 µm, and the 180° peel strength between the resin porous film and the heat resistant porous layer is 0.6 N/cm or more.

6 Claims, 3 Drawing Sheets

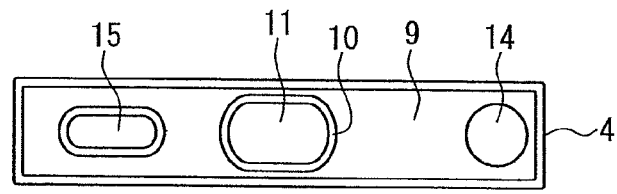
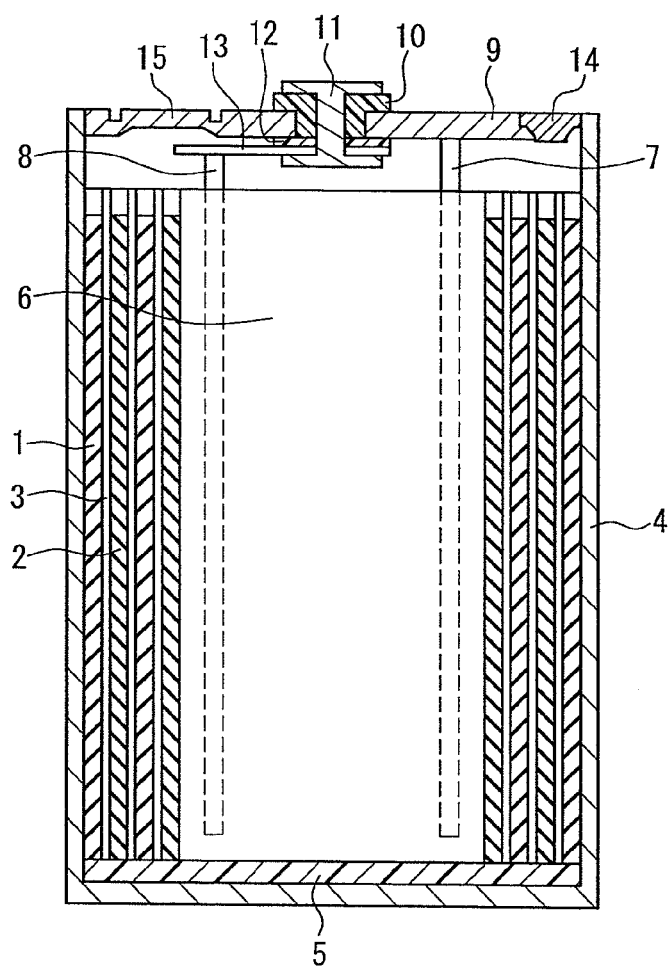

SEPARATOR FOR BATTERY AND NONAQUEOUS ELECTROLYTE BATTERY USING SAME

TECHNICAL FIELD

The present invention relates to a separator for batteries that is inexpensive and has excellent dimensional stability at high temperatures, and a non-aqueous electrolyte battery using such a separator.

BACKGROUND ART

Lithium secondary batteries, which are one type of non-aqueous electrolyte batteries, have a high energy density, and thus are widely used as a power source for portable devices such as cell phones and notebook personal computers. With advances in the portable devices, the trend toward higher capacity lithium secondary batteries is further increasing, and therefore, ensuring safety is becoming an important issue.

Currently available lithium secondary batteries employ, as a separator interposed between a positive electrode and a negative electrode, for example, a polyolefin porous film having a thickness of approximately 15 to 30 μm. In order to ensure what is called a shutdown effect that causes a resin constituting a separator to melt so as to close the pores at a temperature equal to or less than a temperature at which thermal runaway occurs in the battery, and thereby increases the internal resistance of the battery so as to improve battery safety in the event of short-circuiting or the like, polyethylene having a low melting point is often used as a separator material.

As the separator, for example, a film that has been uniaxially or biaxially drawn so as to increase the porosity and improve the strength is used. Such a separator is supplied as a film that exists as a single film, and thus is required to have a certain strength in terms of workability. For this reason, the above-described drawing is performed to ensure a certain strength. However, because such a drawn film has an increased crystallinity, as well as an increased shutdown temperature close to the thermal runaway temperature of the battery, it cannot be said that the margin for ensuring battery safety is sufficient.

There is also another problem that distortion occurs in the film due to drawing, and if the film is exposed to a high temperature, the film shrinks due to residual stress. Because the shrinkage temperature is very close to the shutdown temperature, in the case of using the polyolefin porous film separator, it is necessary to prevent a temperature increase in the battery by reducing the current immediately when the battery temperature reaches the shutdown temperature in the event of overcharging or the like. If the pores do not close sufficiently, and the current cannot be decreased immediately, the battery temperature will quickly rise to the shrinkage temperature of the separator, causing a risk of ignition due to internal short-circuiting.

As techniques for preventing short-circuiting caused by such separator thermal shrinkage so as to enhance battery reliability, for example, Patent Documents 1 and 2 propose the use of a separator in which a heat resistant porous layer for increasing heat resistance is formed on the surface of a resin porous film containing a thermoplastic resin.

According to the techniques disclosed in Patent Documents 1 and 2, it is possible to provide a non-aqueous electrolyte battery having excellent safety and reliability in which thermal runaway does not easily occur even in the event of overheating.

PRIOR ART DOCUMENTS

Patent Documents

Patent Document 1: JP 2008-123996 A
Patent Document 2: JP 2008-210791 A

SUMMARY OF INVENTION

Problem to be Solved by the Invention

The present invention provides a non-aqueous electrolyte battery having excellent reliability by further improving the techniques disclosed in Patent Documents 1 and 2, and a separator for such a battery.

Means for Solving Problem

A first separator for batteries according to the present invention is a separator for batteries, including a multilayer porous film having a resin porous film containing a thermoplastic resin as a main component and a heat resistant porous layer containing heat resistant particles as a main component, wherein the heat resistant porous layer has a thickness of 1 to 15 μm, and 180° peel strength between the resin porous film and the heat resistant porous layer is 0.6 N/cm or more.

A second separator for batteries according to the present invention is a separator for batteries, including a multilayer porous film having a resin porous film containing a thermoplastic resin as a main component and a heat resistant porous layer containing heat resistant particles as a main component, wherein the heat resistant porous layer has a thickness of 1 to 15 μm, and the heat resistant porous layer contains 0.1 to 5 parts by mass of an N-vinylacetamide polymer or a water-soluble cellulose derivative per 100 parts by mass of the heat resistant particles and 1 part by mass or more of a cross-linked acrylic resin per 100 parts by mass of the heat resistant particles.

A non-aqueous electrolyte battery according to the present invention is a non-aqueous electrolyte battery including a positive electrode, a negative electrode, a separator and a non-aqueous electrolyte, wherein the separator is a separator for batteries of the present invention.

Effects of the Invention

According to the present invention, it is possible to provide a non-aqueous electrolyte battery having excellent reliability, and a separator for use in such a battery.

BRIEF DESCRIPTION OF DRAWINGS

FIG. 2A is a plan view showing an example of a non-aqueous electrolyte battery of the present invention, and FIG. 2B is a cross-sectional view of FIG. 2A.

MODES FOR CARRYING OUT THE INVENTION

Figure 1:
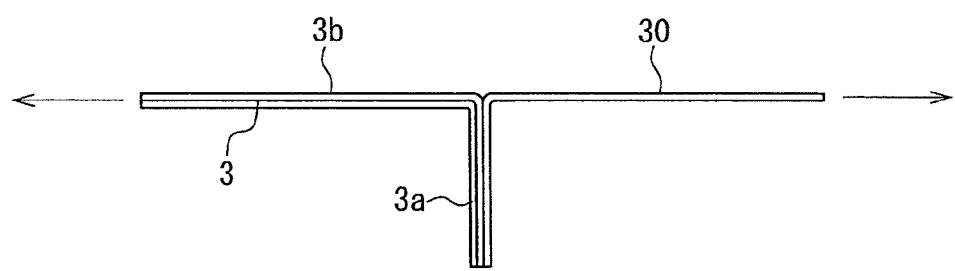
FIG. 1 is a schematic diagram illustrating a method of measuring the 180° peel strength between a resin porous film and a heat resistant porous layer of a separator for batteries.

The separator for batteries of the present invention (hereinafter also referred to simply as "separator") is constituted by a multilayer porous film having a resin porous film containing a thermoplastic resin as a main component and a heat resistant porous layer containing heat resistant particles as a main component, and is suitable for use as a separator for non-aqueous electrolyte batteries. The resin porous film is a layer having an original function as a separator, allowing ions to pass therethrough while preventing short-circuiting between the positive electrode and the negative electrode, and the heat resistant porous layer is a layer that serves to impart heat resistance to the separator.

In the heat resistant porous layer, the heat resistant particles serves to prevent thermal shrinkage and breakage of the resin porous film serving as a base. Also, the heat resistant porous layer mainly containing heat resistant particles separates the positive electrode and the negative electrode from each other even if the resin porous film melts due to overheating of the battery, and therefore battery safety and reliability are ensured.

However, the investigations of the present inventors found that when the resin porous film and the heat resistant porous layer do not sufficiently adhere to each other, if, for example, a large force is suddenly applied to the separator due to an unexpected accident, namely, if abrasion occurs during the battery manufacturing process, if a heavy object such as a weight falls on the battery, if the battery itself falls from a height, if the battery is placed in a condition that causes the battery to overheat, or the like, there is a possibility that the resin porous film serving as a base might shrink rapidly, causing the heat resistant porous layer to become detached, as a result of which the battery safety and reliability might be reduced. Such a problem is likely to occur particularly when the heat resistant porous layer is thin.

To address this, in the separator of the present invention, the adhesion between the resin porous film and the heat resistant porous layer is enhanced while the heat resistant porous layer is made as thin as 1 μm or more and 15 μm or less, and therefore even if an anomaly as mentioned above occurs in a non-aqueous electrolyte battery using the separator, good safety and reliability can be ensured in the battery. In the case where the multilayer porous film constituting the separator has a plurality of heat resistant porous layers, the thickness of the heat resistant porous layer mentioned above is the total thickness of the heat resistant porous layers.

In the separator of the present invention, in terms of the characteristics thereof, the 180° peel strength between the resin porous film and the heat resistant porous layer is set to 0.6 N/cm or more, and preferably 1.0 N/cm or more, in order to enhance the adhesion between the resin porous film and the heat resistant porous layer. When the 180° peel strength between the resin porous film and the heat resistant porous layer of the separator satisfies the above value, even if the heat resistant porous layer is made thin as described above, good safety and reliability can be ensured in the battery that uses the separator. There is no particular limitation on the upper limit value of the 180° peel strength between the resin porous film and the heat resistant porous layer of the separator, but usually, the upper limit value is approximately 5 N/cm.

As used herein, the 180° peel strength between the resin porous film and the heat resistant porous layer of the separator is a value measured by the following method. A test piece having a length of 5 cm and a width of 2 cm is cut from a separator (multilayer porous film), and a piece of adhesive tape is attached to a 2 cm×2 cm region, extending from one end, on the surface of the heat resistant porous layer. The piece of adhesive tape has a width of 2 cm and a length of approximately 5 cm, and the piece of adhesive tape is attached such that one end of the piece of adhesive tape and one end of the separator are aligned with each other. After that, the other end (the end opposite to the end to which the piece of adhesive tape is attached) of the separator test piece to which the piece of adhesive tape is attached and the other end (the end opposite to the end adhering to the separator) of the piece of adhesive tape are held and pulled at a pulling speed of 10 mm/min by a tensile testing machine, and the strength at which the heat resistant porous layer is separated is measured. FIG. 1 schematically shows a side view of a separator test piece being pulled by a tensile testing machine (not shown). In FIG. 1, reference numeral 3 indicates a separator, 3a indicates a resin porous film, 3b indicates a heat resistant porous layer, 30 indicates a piece of adhesive tape, and the arrows indicate pulling directions.

The heat resistant porous layer included in the separator of the present invention ensures heat resistance by containing heat resistant particles as a main component as described above. As used herein, "heat resistance" means that a change in shape such as deformation is not visually observed at at least 150° C. It is preferable that the heat resistant particles have heat resistance that does not cause a shape change at 200° C. or less, more preferably at 300° C. or less, and even more preferably 500° C. or less.

The heat resistant particles are preferably electrically insulating inorganic particles. Specific examples include inorganic oxide particles such as iron oxide, silica ($SiO_2$), alumina ($Al_2O_3$), titania ($TiO_2$), $BaTiO_3$ and ZrO; inorganic nitride particles such as aluminum nitride and silicon nitride; poorly soluble ionic crystal particles such as calcium fluoride, barium fluoride and barium sulfate; covalent crystal particles such as silicon and diamond; and clay particles such as talc and montmorillonite. The inorganic oxide particles may be particles of a mineral resource-derived material such as boehmite, zeolite, apatite, kaoline, mullite, spinel, olivine, sericite or bentonite, or particles of an artificial material thereof. The inorganic compound constituting the inorganic particles may be element-substituted or made into a solid solution as needed, and the inorganic particles may be surface-treated. Furthermore, the inorganic particles may be particles that are electrically insulated as a result of covering the surface of a conductive material, typified by a conductive oxide such as a metal, $SnO_2$ or tin-indium oxide (ITO), or a carbonaceous material such as carbon black or graphite, with an electrically insulating material (for example, the inorganic oxide listed above).

As the heat resistant particles, those listed above may be used alone or in a combination of two or more. Among them, silica particles, alumina particles, boehmite particles, titania particles or barium sulfate particles are more preferably used as the heat resistant particles.

There is no particular limitation on the form of the heat resistant particles, and the heat resistant particles may be in any form such as a spherical, particulate or plate-like form.

The heat resistant particles preferably have an average primary particle size (D50) of 0.1 μm or more, and more preferably 0.2 μm or more. Usually, a heat resistant porous layer is formed using a composition (heat resistant porous layer-forming composition) in which heat resistant particles or the like are dispersed in a medium (solvent), which will be described later in detail. When the heat resistant particles have the above-described primary particle size, the surface area of the heat resistant particles can be reduced, and therefore aggregation of the heat resistant particles in the medium is suppressed, enabling the heat resistant particles to be better dispersed in the medium, and forming a more uniform heat resistant porous layer. If the heat resistant particles are too large, it will be difficult to have a heat resistant porous layer structure in which the movement of Li (lithium) ions within the layer is uniform in the planar direction of the layer, and the particles may serve as a barrier against the movement of Li ions during charge and discharge of the battery. Accordingly, the heat resistant particles preferably have an average primary particle size (D50) of 3 μm or less, and more preferably 2 μm or less.

The average primary particle size of heat resistant particles as used herein is the 50% particle size (D50) on the volume-based cumulative fraction measured using a laser scattering particle distribution analyzer (for example, LA-920 available from Horiba Ltd.) by dispersing particles in a medium (for example, water) that does not cause swelling or dissolution of the particles.

The heat resistant porous layer contains heat resistant particles as a main component, and "containing heat resistant particles as a main component" as used herein means that the heat resistant porous layer contains the heat resistant particles in an amount of 70 vol % relative to the total volume of the constituent components thereof. The amount of heat resistant particles in the heat resistant porous layer is preferably 80 vol % or more relative to the total volume of the constituent components of the heat resistant porous layer, and more preferably 90 vol % or more. A high content of heat resistant particles in the heat resistant porous layer as described above can well suppress the overall thermal shrinkage of the separator. Furthermore, it is preferable that the heat resistant porous layer contains a resin binder in order to bind heat resistant particles together or to bind the heat resistant porous layer to the resin porous film, and from such a viewpoint, a preferred upper limit value of the content of heat resistant particles in the heat resistant porous layer is, for example, 99 vol % relative to the total volume of the constituent component of the heat resistant porous layer. If the amount of heat resistant particles in the heat resistant porous layer is less than 70 vol %, it is necessary to, for example, increase the amount of resin binder in the heat resistant porous layer, and in this case, there is a possibility that the pores of the heat resistant porous layer might be filled with the resin binder, leading to, for example, loss of the separator function. If more pores are formed by using a pore forming agent or the like, the spacing between heat resistant particles will be too large, and the effect of suppressing thermal shrinkage may decrease.

In the separator of the present invention, in terms of the composition thereof, an N-vinylacetamide polymer or water-soluble cellulose derivative and a cross-linked acrylic resin are contained in the heat resistant porous layer in order to enhance the adhesion between the resin porous film and the heat resistant porous layer. The N-vinylacetamide polymer, the water-soluble cellulose derivative and the cross-linked acrylic resin act in the heat resistant porous layer as binders (resin binders) that bond heat resistant particles together as well as the heat resistant porous layer to the resin porous film. Accordingly, the inclusion of an N-vinylacetamide polymer or water-soluble cellulose derivative and a cross-linked acrylic resin in the heat resistant porous layer enables the formation of a separator that satisfies the above-described value of the 180° peel strength between the resin porous film and the heat resistant porous layer.

Also, the heat resistant porous layer is formed using a composition (heat resistant porous layer-forming composition) in which heat resistant particles or the like are dispersed in a medium (solvent) as described above, and the N-vinylacetamide polymer or the water-soluble cellulose derivative functions as a thickener in the composition, contributing to suppressing settlement of the heat resistant particles in the composition, and therefore the use of an N-vinylacetamide polymer or water-soluble cellulose derivative enables a more uniform heat resistant porous layer to be formed.

Examples of the N-vinylacetamide polymer include, in addition to N-vinylacetamide homopolymers (poly(N-vinylacetamide)), copolymers of N-vinylacetamide and ethylenically unsaturated monomer other than N-vinylacetamide.

Examples of ethylenically unsaturated monomers other than N-vinylacetamide that can be used for the N-vinylacetamide copolymer include acrylic acid, methacrylic acid, methyl acrylate, ethyl acrylate, propyl acrylate, butyl acrylate, octyl acrylate, methyl methacrylate, ethyl methacrylate, propyl methacrylate, butyl methacrylate, octyl methacrylate, 2-hydroxyethyl acrylate, 2-hydroxyethyl methacrylate, 2-hydroxypropyl methacrylate, acrylonitrile, methacrylonitrile, vinyl acetate, acrylamide, methacrylamide, N-methylacrylamide, N,N-dimethylacrylamide, N-isopropylacrylamide, vinylpyrrolidone, maleic acid, itaconic acid, 2-acrylamido-2-methyl-propane sulfonate, 2-acrylamidoethane sulfonate, 2-methacrylamidoethane sulfonate, 3-methacrylamidopropane sulfonate, acrylic acid methanesulfonic acid, methacrylic acid methanesulfonic acid, acrylic acid⁻2-ethanesulfonic acid, methacrylic acid⁻2-ethanesulfonic acid, acrylic acid⁻3-propanesulfonic acid, methacrylic acid-3-propanesulfonic acid, acrylic acid-2-methane-3-propanesulfonic acid, methacrylic acid⁻2-methane-3-propanesulfonic acid, acrylic acid⁻1,1'-dimethyl-2-ethanesulfonic acid, methacrylic acid⁻1,1'-dimethyl-2-ethanesulfonic acid or salts thereof, methyl vinyl ketone, ethyl vinyl ketone, methyl vinyl ether, ethyl vinyl ether, fluorine-containing ethylene, styrene or a derivative thereof, and vinyl allyl benzene. They may be used alone or in a combination of two or more.

The copolymerization ratio (mass ratio) of N-vinylacetamide and an ethylenically unsaturated monomer other than N-vinylacetamide is preferably 2 to 50 mass % for the latter ethylenically unsaturated monomer.

The N-vinylacetamide polymer preferably has a mass average molecular weight of 10,000 or more, more preferably 50,000 or more, even more preferably 500,000 or more, and preferably 10,000,000 or less.

Examples of water-soluble cellulose derivatives that can be used in the heat resistant porous layer include carboxymethyl cellulose, hydroxyethyl cellulose, and hydroxypropyl cellulose.

The heat resistant porous layer preferably contains at least one of the N-vinylacetamide polymer and the water-soluble cellulose derivative, but it may contain both. The heat resistant porous layer may contain only one N-vinylacetamide polymer, or it may contain two or more N-vinylacetamide polymers. Furthermore, the heat resistant porous layer may contain only one water-soluble cellulose derivative, or it may contain two or more water-soluble cellulose derivatives.

The content of the N-vinylacetamide polymer or the water-soluble cellulose derivative in the heat resistant porous layer (when the heat resistant porous layer contains either one, the amount thereof, and when the heat resistant porous layer contains both, the total amount thereof, the same applies hereinafter to the content of the N-vinylacetamide polymer or the water-soluble cellulose derivative in the heat resistant porous layer) is preferably 0.1 parts by mass or more and more preferably 0.2 parts by mass or more, per 100 parts by mass of the heat resistant particles of the heat resistant porous layer, from the viewpoint of ensuring good effects obtained by using the N-vinylacetamide polymer or the water-soluble cellulose derivative. However, if the amount of the N-vinylacetamide polymer or the water-soluble cellulose derivative in the heat resistant porous layer is too large, the heat resistant porous layer will be hard, causing a possibility that cracking might easily occur when, for example, the heat resistant porous layer is bent. Accordingly, the content of the N-vinylacetamide polymer or the water-soluble cellulose derivative in the heat resistant porous layer is preferably 5 parts by mass or less and more preferably 3 parts by mass or less, per 100 parts by mass of the heat resistant particles of the heat resistant porous layer.

The cross-linked acrylic resin is preferably, for example, a cross-linked acrylic resin containing butyl acrylate as a main component (a cross-linked acrylic resin having a low glass transition temperature). The cross-linked acrylic resin is preferably formed by crosslinking of a self-crosslinking acrylic resin capable of forming a crosslinked structure in the heat resistant porous layer during separator production. Crosslinked acrylic resins have a low glass transition temperature (Tg) and are very flexible, and therefore using a cross-linked acrylic resin enables the formation of a heat resistant porous layer having excellent flexibility. Using only a cross-linked acrylic resin having flexibility and a low Tg may decrease the strength of the heat resistant porous layer, but using a cross-linked acrylic resin together with the N-vinylacetamide polymer or the water-soluble cellulose derivative that does not soften even at relatively high temperatures enables a very strong and flexible heat resistant porous layer to be formed and the 180° peel strength between the resin porous film and the heat resistant porous layer to be above-described value, for example.

The content of the cross-linked acrylic resin in the heat resistant porous layer is preferably 1 part by mass or more per 100 parts by mass of the heat resistant particles of the heat resistant porous layer from the viewpoint of ensuring good effects obtained by using the cross-linked acrylic resin. Too large a content of cross-linked acrylic resin causes disadvantages such as decreased battery characteristics due to pores between the heat resistant particles being filled, or decreased insulation due to decreased amount of the heat resistant particles, and therefore the content of the cross-linked acrylic resin is preferably 30 parts by mass or less per 100 parts by mass of the heat resistant particles of the heat resistant porous layer.

It is also possible to use a resin binder other than the N-vinylacetamide polymer, the water-soluble cellulose derivative and the cross-linked acrylic resin in the heat resistant porous layer. Examples of such resin binders include resins such as an ethylene-vinyl acetate copolymer (EVA containing 20 to 35 mol % of a vinyl acetate-derived structural unit), an acrylate copolymer, fluorine-based rubber, styrene butadiene rubber (SBR), polyvinyl alcohol (PVA), polyvinyl butyral (PVB), polyvinyl pyrrolidone (PVP), polyurethane, and polyvinylidene fluoride (PVDF). It is also possible to use a resin obtained by introducing a crosslinked structure to a part of the above-listed resins in order to prevent them from being dissolved in the non-aqueous electrolyte.

Other than the resin binders described above, it is also possible to use, in the heat resistant porous layer, a resin binder with improved break elongation obtained by enhancing flexibility by mixing an amine compound, a polyacrylic acid resin or the like to a known resin, or decreasing the glass transition temperature (Tg), or blending a flexibility-imparting additive that is a known plasticizer (a phthalic acid ester or the like). Furthermore, the adhesion of the resin binder can be enhanced by introducing a carboxyl group. As the method of decreasing the Tg of the resin, various known methods can be employed such as introducing a crosslinked structure having a low crosslinking density, and introducing a long side chain.

The content of the resin binder in the heat resistant porous layer (including the amounts of the N-vinylacetamide polymer, the water-soluble cellulose derivative and the cross-linked acrylic resin, the same applies hereinafter to the content of the resin binder in the heat resistant porous layer) is preferably 1.1 parts by mass or more and more preferably 2 parts by mass or more, per 100 parts by mass of the heat resistant particles, from the viewpoint of ensuring good effects obtained by using the resin binder (the effect of improving the adhesion between the resin porous film and the heat resistant porous layer, and the effect of binding the heat resistant partides together in the heat resistant porous layer). However, if the amount of the resin binder in the heat resistant porous layer is too large, the pores of the heat resistant porous layer will be filled, causing a possibility of decreased battery characteristics, such as load characteristics, in the battery that uses the separator. Conversely, if the proportion of the heat resistant particles in the heat resistant porous layer is small, the effect of preventing the resin porous film from thermal shrinkage and breakage may be reduced. Accordingly, the content of the resin binder in the heat resistant porous layer is preferably 30 parts by mass or less and more preferably 20 parts by mass or less, per 100 parts by mass of the heat resistant particles. Thus, the content of the cross-linked acrylic resin in the heat resistant porous layer is set such that the content of the N-vinylacetamide polymer or the water-soluble cellulose derivative and the total content of the resin binder satisfy the above-described values.

The heat resistant porous layer is usually formed using a heat resistant porous layer-forming composition in which heat resistant particles or the like are disposed in a medium (solvent) as described above, and it is preferable that the heat resistant porous layer-forming composition contains a thickener in order to prevent settling of the heat resistant particles. Accordingly, the heat resistant porous layer formed using such a heat resistant porous layer-forming composition also contains the thickener.

Examples of the thickener include, in addition to the N-vinylacetamide polymer and the water-soluble cellulose derivative, synthetic polymers such as polyethylene glycol, polyacrylic acid, and vinyl methylether-maleic anhydride copolymer; natural polysaccharides such as xanthan gum, welan gum, gellan gum, guar gum and carrageenan; starch such as dextrin and $\alpha$-starch; clay minerals such as montmorillonite and hectorite; and inorganic oxides such as fumed silica, fumed alumina and fumed titania. As the thickener, those listed above may be used alone or in a combination of two or more. In the case of using a clay mineral or an inorganic oxide listed above, it is preferable to use particles having a primary particle size smaller than the heat resistant particles (for example, approximately several nm to several tens nm), and the clay mineral or the inorganic oxide preferably has a structure in which a large number of primary particles are connected (fumed silica or the like).

The content of the thickener in the heat resistant porous layer (including the amounts of the N-vinylacetamide polymer and the water-soluble cellulose derivative, the same applies hereinafter to the content of the thickener in the heat resistant porous layer) is preferably 0.1 parts by mass or more, more preferably 0.15 parts by mass or more, and even more preferably 0.2 parts by mass or more, per 100 parts by mass of the heat resistant particles, from the viewpoint of sufficiently covering the heat resistant particles with the thickener and well suppressing settlement of the heat resistant particles in the heat resistant porous layer-forming composition. From the viewpoint of suppressing filling of the pores of the heat resistant porous layer with the thickener and suppressing degradation of battery characteristics of the battery that uses the separator, the content of the thickener in the heat resistant porous layer is preferably 5 parts by mass or less, more preferably 3 parts by mass or less, and even more preferably 1 part by mass or less, per 100 parts by mass of the heat resistant particles.

The resin porous film included in the separator of the present invention preferably contains, as a main component, a thermoplastic resin that softens at 80 to 180° C. to close the pores and that does not dissolve in the non-aqueous electrolyte of the battery. Examples of the thermoplastic resin that softens at 80 to 180° C. include thermoplastic resins having a melting point of 80 to 180° C., measured using a differential scanning calorimeter (DSC) in accordance with Japanese Industrial Standards (JIS) K 7121. Specific examples of the thermoplastic resins include polyolefins and thermoplastic polyurethanes. Examples of polyolefins include polyethylenes such as low density polyethylene, high density polyethylene and ultra high molecular weight polyethylene; and polypropylenes. As the thermoplastic resin, those listed above may be used alone or in a combination of two or more.

The resin porous film may be in any form as long as it has a sufficient ionic conductivity to provide required battery characteristics, but it is preferable to use an ion-permeable microporous film (a microporous film widely used as a separator for batteries) having a large number of pores formed by a conventionally known solvent extraction method, dry or wet drawing method, or the like.

In the resin porous film, the thermoplastic resin is the main component, and specifically, the thermoplastic resin accounts for 50 vol % or more, more preferably 70 vol % or more, even more preferably 80 vol % or more of all constituent components of the resin porous film, and the thermoplastic resin may account for 100 vol %. In order for the shutdown function to better perform its function in the battery, the volume of the thermoplastic resin relative to all constituent components of the separator is preferably 10 vol % or more, and more preferably 20 vol % or more.

From the viewpoint of ensuring good shutdown characteristics of the battery, the resin porous film preferably has a thickness of 8 μm or more, and more preferably 10 μm or more. Also, from the viewpoint of reducing the total thickness of the separator and further improving the battery capacity and the load characteristics, the thickness of the resin porous film is preferably 40 μm or less and more preferably 30 μm or less.

Furthermore, the resin porous film preferably has a pore size of 3 μm or less. When the resin porous film has a small pore size as described above, even if a fragment comes off from the positive electrode or the negative electrode in the battery that uses the separator, the occurrence of short circuiting caused by separation of the fragment can be well suppressed.

The multilayer porous film constituting the separator has a two-layer structure including one resin porous film and one heat resistant porous layer, but it may have a three-layer structure in which, for example, heat resistant porous layers are provided on both sides of a resin porous film.

From the viewpoint of ensuring good shutdown function in the battery in particular, the total thickness of the separator is preferably 10 μm or more, and more preferably 12 μm or more. Also, from the viewpoint of further improving the battery capacity and the load characteristics, the total thickness of the separator is preferably 50 μm or less, and more preferably 30 μm or less.

The overall porosity of the separator is preferably 30% or more in the dry state in order to secure the amount of non-aqueous electrolyte retained and to obtain better ion permeability. On the other hand, from the viewpoint of ensuring strength and preventing internal short-circuiting in the battery, the porosity of the separator is preferably 70% or less in the dry state. The porosity $P(\%)$ of the separator can be calculated by determining the total sum of individual components i using Equation (1) below from the thickness of the separator, the mass per area, and the density of constituent component.

$$P = 100 - (\Sigma a_i/p_i) \times (m/t) \quad (1),$$

where $a_i$ is the proportion of component i expressed in mass %, pi is the density (g/cm$^3$) of component i, m is the mass per unit area (g/cm$^2$) of the separator, and t is the thickness (cm) of the separator.

The porosity $P(\%)$ of the resin porous film can be determined as well by Equation (1) above taking m as the mass per unit area (g/cm$^2$) of the resin porous film and t as the thickness (cm) of the resin porous film in Equation (1). The porosity of the resin porous film determined with this method is preferably 30% or more, and more preferably 40% or more from the viewpoint of increasing the amount of non-aqueous electrolyte retained, and is preferably 80% or less, and more preferably 70% or less from the viewpoint of increasing the physical strength of the resin porous film and ensuring good shutdown characteristics in the battery.

Furthermore, the porosity $P(\%)$ of the heat resistant porous layer can be determined as well by Equation above (1) taking m as the mass per unit area (g/cm$^2$) of the heat resistant porous layer and t as the thickness (cm) of the heat resistant porous layer in Equation (1). The porosity of the heat resistant porous layer determined with this method is preferably 20 to 60%.

The overall air permeability of the separator of the present invention is preferably 10 to 300 sec/100 ml. The reason is that the ion permeability may be reduced if the air permeability of the separator is too high, and the strength of the separator may be reduced if the air permeability of the separator is too low. The air permeability is measured by the method according to JIS P8117, and is expressed in a Gurley value indicating the time, expressed in seconds, required for 100 ml of air to pass through a film under pressure of 0.879 g/mm$^2$.

In the case of a separator made up of a multilayer porous film having a resin porous film containing a thermoplastic resin as a main component and a heat resistant porous layer containing heat resistant particles as a main component as in the case of the present invention, due to the formation of the heat resistant porous layer, the air permeability of the multilayer porous film often becomes higher than that of the resin porous film itself. In other words, the heat resistant porous layer is likely to be the cause that hinders the overall ion permeation of the separator, but in the present invention, even if the heat resistant porous layer is made thin, its function can be maintained, and thus a separator having suitable ion permeability can be formed.

More specifically, the difference between the air permeability of the multilayer porous film and the air permeability of the resin porous film, (the air permeability of the multilayer porous film)—(the air permeability of the resin porous film), can be 50 or less, more preferably 30 or less, and most preferably 15 or less.

The separator of the present invention preferably has a thermal shrinkage rate of 10% or less, measured when allowed to stand in an atmosphere at 150° C. for one hour. In the battery that uses the separator having such a thermal shrinkage rate, short-circuiting caused by shrinkage of the separator at a high temperature can be well suppressed. By employing the configuration described thus far, a separator having the above-descried thermal shrinkage rate can be obtained.

The thermal shrinkage rate of the separator is a value measured using the following method. The separator is cut into a rectangular shape having a length of 5 cm and a width of 10 cm, and crossed lines with a 3 cm vertically parallel line and a 3 cm horizontally parallel line are drawn. Cutting of the separator into a rectangular shape is performed such that either the length direction or the width direction will be in agreement with the direction of the production of the separator (for example, when the resin porous film constituting the separator is obtained through a drawing process, the direction in which the resin porous film was drawn), and the crossed lines are drawn such that the intersection is located at the center of the separator piece. After that, the separator piece is allowed to stand in a thermostatic oven heated to 150° C. for one hour, removed therefrom and cooled. Then, the length d(mm) of the shorter one of the crossed lines is measured, and then thermal shrinkage rate (%) is calculated using the following equation.

Thermal shrinkage rate=100×(30·d)/30

The separator of the present invention can be produced using a method in which, for example, heat resistant particles, a resin binder, a thickener and the like that constitute a heat resistant porous layer are dispersed in a medium such as water or an organic solvent to prepare a heat resistant porous layer-forming composition in the form of a slurry or a paste (the resin binder and the thickener may be dissolved in the medium), and the heat resistant porous layer-forming composition is applied onto the surface of a resin porous film and dried.

The application of the heat resistant porous layer-forming composition onto the resin porous film surface can be carried out using, for example, a method in which the heat resistant porous layer-forming composition is applied onto the surface of a resin porous film with a known application apparatus, a method in which a resin porous film is impregnated in the heat resistant porous layer-forming composition, or the like.

Examples of the application apparatus that can be used to apply the heat resistant porous layer-forming composition onto the resin porous film surface include a gravure coater, a knife coater, a reverse roll coater, and a die water.

The medium used in the heat resistant porous layer-forming composition can be any medium as long as the heat resistant particles and the like can be uniformly dispersed and the resin binder can be uniformly dissolved or dispersed, and a commonly used solvent is preferably used such as an aromatic hydrocarbon such as toluene, a furan such as tetrahydrofuran, a ketone such as methyl ethyl ketone or methyl isobutyl ketone. For the purpose of controlling interfacial tension, an alcohol (ethylene glycol, propylene glycol or the like), any type of propylene oxide-based glycol ether such as monomethyl acetate, or the like may be added to the medium as appropriate. In the case where the resin binder is water-soluble or is used as an emulsion, water may be used as a medium as described above. In this case as well, an alcohol (methyl alcohol, ethyl alcohol, isopropyl alcohol, ethylene glycol or the like) may be added as appropriate to control interfacial tension.

In the heat resistant porous layer-forming composition, the solid content (the total amount of components other than the medium) is preferably 10 to 80 mass %, for example.

In order to increase the adhesion to the heat resistant porous layer, the resin porous film may be subjected to surface modification. As described above, the resin porous film is preferably made of polyolefin, but in this case, generally, the adhesiveness of the surface is not high, and therefore it is often effective to perform surface modification.

Examples of the surface modification method for the resin porous film include corona discharge treatment, plasma discharge treatment, and ultraviolet radiation treatment. From the viewpoint of coping with environmental problems, it is more desirable to use water, for example, as a medium in the heat resistant porous layer-forming composition, and for this reason, it is highly preferable to perform surface modification so as to increase the hydrophilicity of the surface of the resin porous film.

There is no particular limitation on the non-aqueous electrolyte battery of the present invention as long as it includes a positive electrode, a negative electrode, the separator of the present invention and a non-aqueous electrolyte, and configurations and structures employed in conventionally known non-aqueous electrolyte batteries can be used. The non-aqueous electrolyte battery of the present invention can be a primary battery or a secondary battery, but the following will illustrate, in particular, the configuration of a secondary battery, which is a primary application of the present invention.

The non-aqueous electrolyte secondary battery can have any form, such as a columnar form (rectangular cylinder form, circular cylinder form or the like), in which a steel can, an aluminum can or the like is used as an outer case can. It is also possible to use a soft package battery in which a laminated film having a metal deposited thereon is used as an outer case.

There is no particular limitation on the positive electrode as long as it is a conventionally known positive electrode used in non-aqueous electrolyte secondary batteries, or in other words, a positive electrode containing an active material capable of intercalating and deintercalating Li ions. Examples of the active material include a layer-structured lithium-containing transition metal oxide represented by a general formula: $Li_{1+x}MO_2$ (where $-0.1<x<0.1$, and M is Co, Ni, Mn, Al, Mg, Zr, Ti, Sn or the like), a spinel-structured lithium manganese oxide such as $LiMn_2O_4$ or an oxide obtained by substituting a part of $LiMn_2O_4$ with another element, and an olivine type compound represented by $LiMPO_4$ (where M is Co, Ni, Mn, Fe or the like). Specific examples of the layer-structured lithium-containing transition metal oxide include $LiCoO_2$, $LiNi_{1-x}Co_{x-y}Al_yO_2$ ($0.1 \le x \le 0.3$, and $0.01 \le y \le 0.2$), and an oxide containing at least Co, Ni and Mn ($LiMn_{1/3}Ni_{1/3}Co_{1/3}O_2$, $LiMn_{5/12}Co_{1/6}O_2$, $LiNi_{3/5}Mn_{1/5}Co_{1/5}O_2$ or the like).

A carbon material such as carbon black may be used as a conductive aid material, and a fluorocarbon resin such as PVDF may be used as a binder. A positive electrode material mixture obtained by mixing these materials with the active material is used to form a positive electrode material mixture layer on the surface of a current collector, for example.

As a positive electrode current collector, a metal foil such as aluminum, a punched metal sheet, a mesh, an expanded metal or the like can be used, and usually, an aluminum foil having a thickness of 10 to 30 μm is preferably used.

A positive electrode lead portion is usually provided by forming an exposed portion in the current collector by not forming a positive electrode material mixture layer on a part of the current collector when producing a positive electrode. However, the lead portion is not necessarily initially integrated with the current collector, and it may be provided by connecting an aluminum foil or the like to the current collector at a later time.

There is no particular limitation on the negative electrode as long as it is a conventionally known negative electrode used in non-aqueous electrolyte secondary batteries, or in other words, a negative electrode containing an active material capable of intercalating and deintercalating Li ions. As the active material, one of or a mixture of two or more of carbon-based materials capable of intercalating and deintercalating Li ions is used, such as graphite, pyrolytic carbon, coke, glassy carbon, baked products of organic polymer compounds, mesocarbon microbeads (MCMB) and carbon fiber. It is also possible to use an element, such as Si, Sn, Ge, Bi, Sb or In, an alloy thereof, a compound capable of charging and discharging at a low voltage close to that of a lithium metal, such as a lithium-containing nitride or an oxide such as Li4Ti5O12, a lithium metal, or a lithium/aluminum alloy as the negative electrode active material. A conductive aid material (a carbon material such as carbon black, or the like), a binder such as PVDF, and the like are added to the negative electrode active material as appropriate to prepare a negative electrode material mixture, the negative electrode material mixture is used to form a molded article (negative electrode material mixture layer) by using a current collector as a core, and the obtained article is used as the negative electrode. Alternatively, a foil made of any of the above-listed various alloys or a lithium metal foil alone, or a laminate obtained by laminating such foils on the surface of a current collector is used as the negative electrode.

In the case where a current collector is used in the negative electrode, a copper or nickel foil, a punched metal sheet, a mesh, an expanded metal or the like can be used as the current collector, and usually, a copper foil is used. In the case where the total thickness of the negative electrode is reduced in order to obtain a high energy density battery, the thickness of the negative electrode current collector preferably has an upper limit of 30 μm and desirably has a lower limit of 5 μm. A negative electrode lead portion can be formed in the same manner as the positive electrode lead portion.

The electrodes are used in the form of a laminate electrode assembly in which the above-described positive electrode and the above-described negative electrode are laminated with the separator of the present invention interposed therebetween, or in the form of a wound electrode assembly obtained by winding the laminate electrode assembly.

As the non-aqueous electrolyte, a solution in which a lithium salt is dissolved in an organic solvent is used. There is no particular limitation on the lithium salt as long as it can dissociate into $Li^+$ ions in the solvent and does not easily cause a side reaction, such as decomposition, in a voltage range in which the battery is used. Examples for use include inorganic lithium salts such as $LiClO_4$, $LiPF_6$, $LiBF_4$, $LiAsF_6$ and $LiSbF_6$, and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 7$) and $LiN(RfOSP_2)_2$, where Rf is a fluoroalkyl group.

There is no particular limitation on the organic solvent used in the non-aqueous electrolyte as long as it can dissolve the above-listed lithium salts and does not cause a side reaction, such as decomposition, in a voltage range in which the battery is used. Examples include: cyclic carbonates such as ethylene carbonate, propylene carbonate, butylene carbonate and vinylene carbonate; linear carbonates such as dimethyl carbonate, diethyl carbonate and methyl ethyl carbonate; linear esters such as methyl propionate; cyclic esters such as y-butyrolactone; linear ethers such as dimethoxyethane, diethyl ether, 1,3-dioxolane, diglyme, triglyme and tetraglyme; cyclic ethers such as dioxane, tetrahydrofuran and 2-methyltetrahydrofuran; nitriles such as acetonitrile, propionitrile and methoxy propionitrile; and sulfite esters such as ethylene glycol sulfite. These may be used in a combination of two or more. In order to obtain a battery with good characteristics, it is desirable to use a combination that can provide a high conductivity such as a solvent mixture of an ethylene carbonate and a linear carbonate. For the purpose of improving characteristics such as safety, charge/discharge cycle characteristics and high temperature storage characteristics, an additive such as vinylene carbonate, 1,3-propane sultone, diphenyl disulfide, cyclohexyl benzene, biphenyl, fluorobenzene, or t-butyl benzene can be added to the electrolyte as appropriate.

The concentration of the lithium salt in the non-aqueous electrolyte is preferably 0.5 to 1.5 mol/l, and more preferably 0.9 to 1.25 mol/l.

It is also possible to use, instead of the organic solvent, a room temperature molten salt such as ethyl-methylimidazolium trifluoromethyl sulfonium imide, heptyl-trimethylammonium trifluoromethyl sulfonium imide, pyridinium trifluoromethyl sulfonium imide, or guadinium trifluoromethyl sulfonium imide.

Furthermore, it is also possible to use an electrolyte obtained by gelling the above-described non-aqueous electrolyte by using a known host polymer capable of forming a gel electrolyte, such as PVDF, a vinylidene fluoride-hexafluoropropylene copolymer (PVDF-HFP), polyacrylonitrile (PAN), polyethylene oxide, polypropylene oxide, an ethylene oxide-propylene oxide copolymer, a crosslinked polymer containing an ethylene oxide chain as a main chain or a side chain, or a crosslinked poly(meth)acrylic acid ester.

EXAMPLES

Hereinafter, the present invention will be described in detail by way of examples. It should be noted, however, that the examples given below are not intended to limit the present invention.

Example 1

Production of Separator

Plate-like boehmite (D50: 1 μm, aspect ratio: 10) as heat resistant particles in an amount of 1000 g and ammonium polyacrylate (1 part by mass per 100 parts by mass of boehmite) as a dispersant were added to and dispersed in 1000 g of water using a tabletop ball mill for six days, thereafter an emulsion of self-crosslinking acrylic resin (self-crosslinking acrylic resin containing butyl acrylate as a main component and capable of forming a crosslinked structure during separator production) as a resin binder (the amount of the self crosslinking acrylic resin was 3 parts by mass per 100 parts by mass of boehmite) was added, and an aqueous solution of an N-vinylacetamide copolymer as a thickener (1 part by mass of the N-vinylacetamide copolymer per 100 parts by mass of boehmite) was added and dispersed by stirring for one hour using a three-one motor stirrer to prepare a uniform slurry (heat resistant porous layer-forming composition).

APE microporous film having a thickness of 16 μm, a porosity of 40% and an air permeability of 180 sec/100 ml, and one side of which had been corona discharge treated was prepared as a resin porous film. The above slurry was uniformly applied to the corona discharge treated surface of the PE microporous film using a die coater to have a thickness after drying of 3 μm, and dried to produce a separator having a heat resistant porous layer containing plate-like boehmite, an N-vinylacetamide copolymer and a self-crosslinking acrylic resin-derived cross-linked acrylic resin and the like on one side of the PE microporous film. For the heat resistant porous layer of the separator, the volume ratio of boehmite calculated assuming that the specific gravity of boehmite was 3 $g/cm^3$ and the specific gravity of the resin binder and the thickener was 1 $g/cm^3$ was 86 vol %. The overall air permeability of the separator was 210 sec/100 ml, and the difference between the air permeability of the separator and the air permeability of the resin porous film was 30 sec/100 ml.

Production of Negative Electrode

Graphite as a negative electrode active material in an amount of 95 parts by mass and 5 parts by mass of PVDF as a binder were uniformly mixed using NMP as a solvent to prepare a negative electrode material mixture-containing paste. The negative electrode material mixture-containing paste was intermittently applied onto both sides of a 10 μm thick current collector made of a copper foil such that the front side had an application length of 320 mm and the back side had an application length of 260 mm, dried, calendered to adjust the thickness of the negative electrode material mixture layer such that the total thickness was 142 μm, and cut to a length of 330 mm and a width of 45 mm, thereby producing a negative electrode. Furthermore, a lead portion was formed by welding a tab to a portion of the negative electrode where the current collector was exposed.

Production of Positive Electrode

LiCoO2 as a positive electrode active material in an amount of 85 parts by mass, 10 parts by mass of acetylene black as a conductive aid material and 5 parts by mass of PVDF as a binder were uniformly mixed using NMP as a dispersant to prepare a positive electrode material mixture-containing paste. The obtained paste was intermittently applied onto both sides of a 15 μm-thick aluminum foil serving as a current collector such that the front side had an application length of 320 mm and the back side had an application length of 260 mm, dried, calendered to adjust the thickness of the positive electrode material mixture layer such that the total thickness was 150 μm, and cut to a length of 330 mm and a width of 43 mm, thereby producing a positive electrode. Furthermore, a lead portion was formed by welding a tab to a portion of the positive electrode where the current collector was exposed.

Assembly of Battery

The above-described positive electrode and negative electrode were laminated with the above-described separator slit into a width of 47 mm interposed therebetween, and spirally wound to obtain a wound electrode assembly. The obtained wound electrode assembly was pressed into a flat shape, and then housed in an aluminum outer case can having a thickness of 6 mm, a height of 50 mm and a width of 34 mm. Then, a non-aqueous electrolyte (a solution obtained by dissolving $LiPF_6$ at a concentration of 1 mol/l in a solvent of ethylene carbonate and ethyl methyl carbonate mixed at a volume ratio of 1:2) was injected in an amount of 2.4 ml, and thereafter sealing was performed to produce a non-aqueous electrolyte battery having the structure shown in FIGS. 2A and 2B and the outer appearance shown in FIG. 3.

The battery shown in FIGS. 2A, 2B and 3 will be described here. FIG. 2A is a plan view of a battery of this example, and FIG. 2B is a cross-sectional view of FIG. 2A. As shown in FIG. 2B, a positive electrode 1 and a negative electrode 2 are spirally wound with a separator 3 interposed therebetween as described above, and then pressed into a flat shape to form a flat wound electrode assembly 6, and the electrode assembly 6 is housed in a rectangular cylindrical outer case can 4 together with a non-aqueous electrolyte. In order to simplify the illustration of FIG. 2B, metal foils serving as current collectors used to produce the positive electrode 1 and the negative electrode 2 and the electrolyte are not shown. Also, in the separator 3, the resin porous film and the heat resistant porous layer are not specifically illustrated. The separator 3 is shown in cross section in FIG. 2B, and its cross section is not hatched.

The outer case can 4 is a battery outer case made of an aluminum alloy, and the outer case can 4 also serves as a positive electrode terminal. An insulator 5 made of a PE sheet is placed on the bottom of the outer case can 4, and a positive electrode lead portion 7 and a negative electrode lead portion 8, which are connected to the ends of the positive electrode 1 and the negative electrode 2, respectively, are drawn from the flat-shaped wound electrode assembly 6 including the positive electrode 1, the negative electrode 2 and the separator 3. A stainless steel terminal 11 is attached to a sealing lid plate 9 made of an aluminum alloy for sealing the opening of the outer case can 4 with a polypropylene insulation packing 10 interposed therebetween, and a stainless steel lead plate 13 is attached to the terminal 11 with an insulator 12 interposed therebetween.

Then, the lid plate 9 is inserted into the opening of the outer case can 4, the joint portions of these two are welded so as to seal the opening of the outer case can 4, and thereby the interior of the battery is sealed. In the battery shown in FIGS. 2A and 2B, the lid plate 9 is provided with a non-aqueous electrolyte inlet 14. The non-aqueous electrolyte inlet 14 is sealed by welding such as, for example, laser welding, with a sealing member inserted in the non-aqueous electrolyte inlet 14, and thereby the seal of the battery is ensured. Accordingly, in the battery shown in FIGS. 2A, 2B and 3, the non-aqueous electrolyte inlet 14 actually includes the non-aqueous electrolyte inlet and the sealing member, but in order to simplify the illustration, they are indicated as the non-aqueous electrolyte inlet 14. The lid plate 9 is also provided with a rupture vent 15 serving as a mechanism that discharges internal gas to the outside in the event of overheating of the battery In the battery of Example 1, the positive electrode lead portion 7 is welded directly to the lid plate 9, whereby the outer case can 4 and the lid plate 9 function as a positive electrode terminal. Likewise, the negative electrode lead portion 8 is welded to the lead plate 13, and the negative electrode lead portion 8 and the terminal 11 are electrically connected via the lead plate 13, whereby the terminal 11 functions as a negative electrode terminal.

Figure 3:
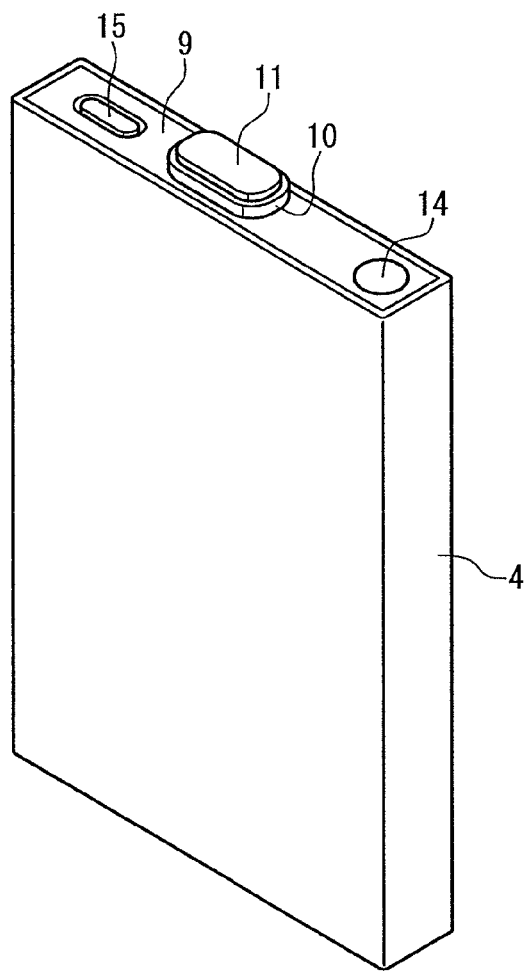
FIG. 3 is a perspective view of FIG. 2A.

FIG. 3 is a perspective view schematically showing the outer appearance of the battery shown in FIG. 2A, and FIG. 3 is illustrated to indicate that the battery is a prismatic battery. FIG. 3 schematically shows the battery, and thus only specific constituent elements of the battery are shown. Similarly, in FIG. 2B, the innermost portion of the electrode assembly is not shown in cross section.

Example 2

A heat resistant porous layer-forming slurry was prepared in the same manner as in Example 1, except that the amount of the N-vinylacetamide copolymer aqueous solution added was changed such that the amount of the N-vinylacetamide copolymer was 3 parts by mass per 100 parts by mass of boehmite. A separator was produced in the same manner as in Example 1, except that the prepared slurry was used, and a non-aqueous electrolyte battery was produced in the same manner as in Example 1, except that the produced separator was used.

For the heat resistant porous layer of the separator, the volume ratio of boehmite calculated assuming that the specific gravity of boehmite was 3 $g/cm^3$ and the specific gravity of the resin binder and the thickener was 1 $g/cm^3$ was 82 vol %. The overall air permeability of the separator was 188 sec/100 ml, and the difference between the air permeability of the separator and the air permeability of the resin porous film was 8 sec/100 ml.

Example 3

A heat resistant porous layer-forming slurry was prepared in the same manner as in Example 1, except that instead of the N-vinylacetamide copolymer aqueous solution, carboxymethyl cellulose was added in an amount of 1 part by mass per 100 parts by mass of boehmite. A separator was produced in the same mariner as in Example 1, except that the prepared slurry was used, and a non-aqueous electrolyte battery was produced in the same manner as in Example 1, except that the produced separator was used.

For the heat resistant porous layer of the separator, the volume ratio of boehmite calculated assuming that the specific gravity of boehmite was 3 g/cm$^3$ and the specific gravity of the resin binder and the thickener was 1 g/cm$^3$ was 86 vol %. The overall air permeability of the separator was 189 sec/100 ml, and the difference between the air permeability of the separator and the air permeability of the resin porous film was 9 sec/100 ml.

Example 4

A heat resistant porous layer-forming slurry was prepared in the same manner as in Example 1, except that the plate-like boehmite as the heat resistant particles was changed to crushed natural silica particles (D50: 1 μm, BET specific surface area: 10 m$^2$/g). A separator was produced in the same manner as in Example 1, except that the prepared slurry was used, and a non-aqueous electrolyte battery was produced in the same manner as in Example 1, except that the produced separator was used.

For the heat resistant porous layer of the separator, the volume ratio of silica calculated assuming that the specific gravity of silica was 2 g/cm$^3$ and the specific gravity of the resin binder and the thickener was 1 g/cm$^3$ was 90 vol %.

Example 5

A heat resistant porous layer-forming slurry was prepared in the same manner as in Example 1, except that the plate-like boehmite as the heat resistant particles was changed to an alumina composite (D50: 1 μm, BET specific surface area: 5 m$^2$/g). A separator was produced in the same manner as in Example 1, except that the prepared slurry was used, and a non-aqueous electrolyte battery was produced in the same manner as in Example 1, except that the produced separator was used.

For the heat resistant porous layer of the separator, the volume ratio of alumina calculated assuming that the specific gravity of alumina was 4 g/cm$^3$ and the specific gravity of the resin binder and the thickener was 1 g/cm$^3$ was 79 vol %.

Example 6

A heat resistant porous layer-forming slurry was prepared in the same manner as in Example 1, except that the plate-like boehmite as the heat resistant particles was changed to a titania composite (D50: 1 μm). A separator was produced in the same manner as in Example 1, except that the prepared slurry was used, and a non-aqueous electrolyte battery was produced in the same manner as in Example 1, except that the produced separator was used.

For the heat resistant porous layer of the separator, the volume ratio of titania calculated assuming that the specific gravity of titania was 3.9 g/cm$^3$ and the specific gravity of the resin binder and the thickener was 1 g/cm$^3$ was 83 vol %.

Comparative Example 1

A heat resistant porous layer-forming slurry was prepared in the same manner as in Example 1, except that the thickener was changed to xanthan gum and the amount of the thickener was changed to 0.2 parts by mass per 100 parts by mass of boehmite. A separator was produced in the same manner as in Example 1, except that the prepared slurry was used, and a non-aqueous electrolyte battery was produced in the same manner as in Example 1, except that the produced separator was used. The overall air permeability of the separator was 188 sec/100 ml, and the difference between the air permeability of the separator and the air permeability of the resin porous film was 8 sec/100 ml.

Comparative Example 2

A heat resistant porous layer-forming slurry was prepared in the same manner as in Example 1, except that the amount of the N-vinylacetamide copolymer aqueous solution added was changed such that the amount of the N-vinylacetamide copolymer was 0.05 parts by mass per 100 parts by mass of boehmite. A separator was produced in the same manner as in Example 1, except that the prepared slurry was used, and a non-aqueous electrolyte battery was produced in the same manner as in Example 1, except that the produced separator was used.

Comparative Example 3

A non-aqueous electrolyte battery was produced in the same manner as in Example 1, except that a PE microporous film having a thickness of 16 μm and a porosity of 40% but without a heat resistant porous layer was used as a separator.

Table 1 shows the 180° peel strength between the resin porous film and the heat resistant porous layer measured by the above method and the thermal shrinkage rate measured by the above method for the separators of Examples 1 to 6 and Comparative Examples 1 to 3, together with the type and amount of the thickener and the amount of the cross-linked acrylic resin (self-crosslinking acrylic resin-derived cross-linked acrylic resin) used to form individual separators. In the column labeled "Type" of the thickener in Table 1, "PNVA" means the N-vinylacetamide copolymer, and "CMC" means carboxymethyl cellulose. The column labeled "Amount" of the thickener indicates an amount per 100 parts by mass of heat resistant particles (part by mass). Also, the column labeled "Amount of cross-linked acrylic resin" in Table 1 indicates an amount per 100 parts by mass of heat resistant particles (part by mass). Furthermore, in Table 1, the 180° peel strength between the resin porous film and the heat resistant porous layer is indicated simply as "peel strength".

Furthermore, the non-aqueous electrolyte batteries of Examples 1 to 6 and

Comparative Examples 1 to 3 were subjected to the following heat test. The results are also shown in Table 1.

Heat Test

Each of the batteries of Examples 1 to 6 and Comparative Examples 1 to 3 was charged at a constant current of 0.5 C to 4.35 V Charging was performed in an ambient atmosphere of 20 to 25° C. and in a state in which the battery surface temperature was the same as the ambient atmospheric temperature. Each charged battery was placed in a thermostatic oven, and the temperature of the chamber was raised at a rate of 5° C./min to 150° C., and then the temperature was maintained at 150° C. for three hours. The surface temperature of the battery was measured using a thermocouple from the start of the temperature rise in the thermostatic oven until the end of 3-hour holding period at 150° C., and the highest battery surface temperature was determined. The heat test was carried out using three batteries, and the average of three batteries was determined for each of the examples and the comparative examples.

TABLE 1

|  | Multilayer porous film | | | | |
| --- | --- | --- | --- | --- | --- |
|  | Thickener | | Amount of cross-linked acrylic resin (part by mass) | Peel strength (N/cm) | Thermal shrinkage rate (%) | Heat test Highest Temperature (° C.) |
|  | Type | Amount (part by mass) | | | | |
| Ex. 1 | PNVA | 1 | 3 | 1.6 | 2.9 | 150 |
| Ex. 2 | PNVA | 3 | 3 | 3.0 | 1.0 | 150 |
| Ex. 3 | CMC | 1 | 3 | 1.4 | 3.2 | 152 |
| Ex. 4 | PNVA | 1 | 3 | 1.2 | 3.5 | 153 |
| Ex. 5 | PNVA | 1 | 3 | 1.5 | 3.4 | 151 |
| Ex. 6 | PNVA | 1 | 3 | 1.1 | 3.8 | 152 |
| Comp. Ex. 1 | Xanthan gum | 0.2 | 3 | 0.5 | 10.6 | 160 |
| Comp. Ex. 2 | PNVA | 0.05 | 3 | 0.3 | 15.2 | 162 |
| Comp. Ex. 3 | No heat resistant porous layer | | | | 38.0 | 164 |

As can be clearly seen from Table 1, the batteries of Examples 1 to 6, which used a separator in which an N-vinylacetamide polymer or water-soluble cellulose derivative and a cross-linked acrylic resin were contained in the heat resistant porous layer and the 180° peel strength between the resin porous film and the heat resistant porous layer was a preferred value, had a small thermal shrinkage rate and exhibited an extremely stable behavior in the heat test, and thus had high reliability.

On the other hand, the battery of Comparative Example 1, which used a separator in which xanthan gum was used as a thickener in the heat resistant porous layer, and the battery of Comparative Example 2, which used a separator in which the content of the N-vinylacetamide polymer as a thickener in the heat resistant porous layer was small, had a small peel strength and a large thermal shrinkage rate, and exhibited an unstable behavior in the heat test. The battery of Comparative Example 3, which used a separator without a heat resistant porous layer, had an extremely large thermal shrinkage rate and exhibited an unstable behavior in the heat test.

The separator of the present invention has a small difference in air permeability with the resin porous film itself, and therefore the formed heat resistant porous layer is unlikely to be the cause that inhibits the overall ion permeability of the separator. Accordingly, the use of the separator of the present invention enables the formation of a non-aqueous electrolyte battery that is excellent in load characteristics.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

Industrial Applicability

According to the present invention, it is possible to provide a non-aqueous electrolyte battery having excellent reliability and a separator for such a battery. The non-aqueous electrolyte battery of the present invention can be used for the same applications as conventionally known non-aqueous electrolyte batteries, such as power sources for various electronic devices.

Description Of Reference Numerals
1 Positive Electrode
2 Negative Electrode
3 Separator
3a Resin Porous Film
3b Heat Resistant Porous Layer
30 Adhesive Tape

The invention claimed is:
1. A separator for batteries, comprising a multilayer porous film including a resin porous film containing a thermoplastic resin as a main component and a heat resistant porous layer containing heat resistant particles as a main component,
wherein the heat resistant porous layer has a thickness of 1 to 15 μm,
the heat resistant porous layer contains:
0.1 to 5 parts by mass of an N-vinylacetamide polymer or a water-soluble cellulose derivative per 100 parts by mass of the heat resistant particles; and
1 part by mass or more and 30 parts by mass or less of an acrylic resin forming a crosslinked structure per 100 parts by mass of the heat resistant particles, and
the water-soluble cellulose derivative is carboxymethyl cellulose, hydroxyethyl cellulose, or hydroxypropyl cellulose.
2. The separator for batteries according to claim 1, wherein the thermoplastic resin is polyolefin.
3. The separator for batteries according to claim 1, wherein the heat resistant particles are particles of at least one selected from the group consisting of silica, alumina, boehmite, titania and barium sulfate.
4. The separator for batteries according to claim 1, wherein the separator has a thermal shrinkage rate of 10% or less, measured when the separator is allowed to stand in an atmosphere at 150° C. for one hour.
5. A non-aqueous electrolyte battery comprising a positive electrode, a negative electrode, a separator and a non-aqueous electrolyte,
wherein the separator is the separator for batteries according to claim 1.

6. The separator for batteries according to claim 1, wherein 180° peel strength between the resin porous film and the heat resistant porous layer is 0.6 N/cm or more and 5 N/cm or less.

* * * * *

UNITED STATES PATENT AND TRADEMARK OFFICE
CERTIFICATE OF CORRECTION

PATENT NO. : 8,771,859 B2  
APPLICATION NO. : 13/059095  
DATED : July 8, 2014  
INVENTOR(S) : Nobuaki Matsumoto et al.

Page 1 of 1

It is certified that error appears in the above-identified patent and that said Letters Patent is hereby corrected as shown below:

ON THE TITLE PAGE:

At item (73), Assignee, change "Hitachi Maxell, Ltd., Ibaraki-Shi (IL)" to --Hitachi Maxell, Ltd., Ibaraki-Shi (JP)--.

Signed and Sealed this

Thirteenth Day of January, 2015

Michelle K. Lee
*Deputy Director of the United States Patent and Trademark Office*